May 19, 1925.
J. S. KATZIN
VALVE
Filed Jan. 10, 1925
1,537,948
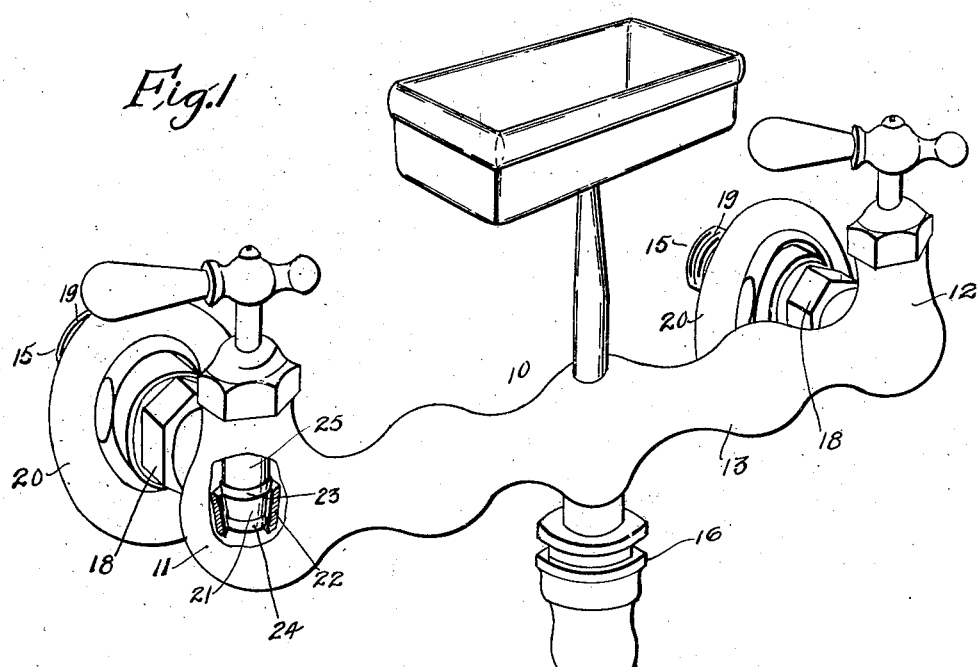
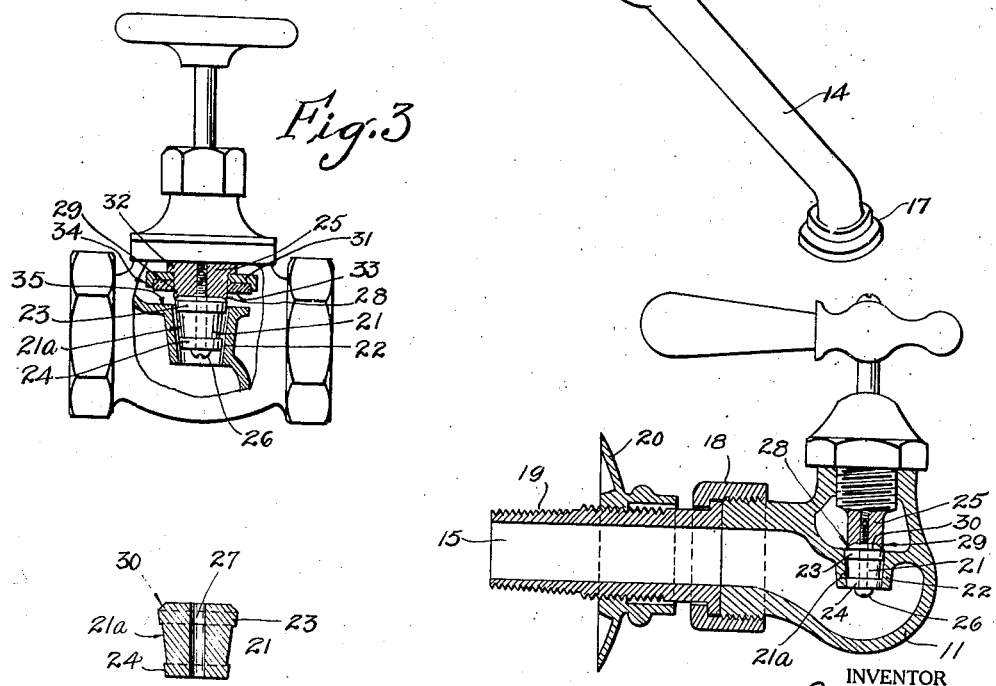
INVENTOR
J. S. Katzin
BY Geo. H. Beeler
ATTORNEY Patented May 19, 1925.

1,537,948

UNITED STATES PATENT OFFICE.

JACOB S. KATZIN, OF NEWARK, NEW JERSEY, ASSIGNOR OF ONE-HALF TO GIZELLA KLEINMAN, OF BROOKLYN, NEW YORK.

VALVE.

Application filed January 10, 1925. Serial No. 1,663.

*To all whom it may concern:*

Be it known that I, JACOB S. KATZIN, a citizen of the United States, residing at Newark, in the county of Essex and State of New Jersey, have invented certain new and useful Improvements in Valves, of which the following is a specification.

This invention relates to fluid controlling devices and more particularly to valves adapted for use in connection with plumbing or heating fixtures or liquid control devices.

One of the objects of this invention is to provide a valve mechanism adapted for the control of a fluid under pressure so as to regulate the flow of said fluid, said valve mechanism being arranged to operate under conditions of continuous and repeated wear, such as, for instance, obtain in the household use of plumbing or heating fixtures.

Another object of this invention is to provide a valve mechanism having means comprising a plurality of valves operative particularly to meet any emergency in the control of the fluid that may arise under the usual operating conditions.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a perspective view showing a typical use of my invention.

Fig. 2 is a sectional view showing the invention.

Fig. 3 is a front view partly in section showing a variation.

Fig. 4 is a sectional view of a detail.

Referring now more particularly to the drawings, I show a plumbing fixture 10 wherein my device is especially adapted for use, said fixture being representative of the uses and objects for which the device is available. Said fixture comprises preferably a plurality of valve bodies 11 and 12 which are direct-connected by means of an ornamental tubular device 13, so that said valves will discharge a fluid through a common outlet such as the nozzle 14. The fluid is arranged to enter the valves through rear end openings as shown at 15, the valves being for this purpose preferably of the globe angle type. The nozzle 14 is connected to the fixture by means of a swivel joint at 16, while the orifice thereof is provided with a strainer at 17. The fixture is adapted particularly for the mixing of hot and cold fluids which pass through the different valves and then discharge at the temperature desired for the ready and convenient use of the operator.

The method of attaching the fixture comprises a union connection 18, one of which is provided for each fitting, each union having an extended male connection 19 upon which a plate 20 is supported slidably and for threaded adjustment therealong according to the condition or the extent of projection of the fluid supply pipes.

The valve mechanism comprises a valve adapted to seat in the valve body along a plurality of vertically spaced planes, so as to insure a good and uniform closure of the valve, the vertical spaces between the aforesaid planes being adapted for the catching of dirt or other solid bodies to prevent injury to the valve or the valve seat. As a practical embodiment of the idea, I show a frusto-conical valve 21 arranged to seat within a hollow frusto-conical seat member 22. The valve member 21 has a plurality of contact or ring portions 23 and 24 which are concentric with the valve member and the seat member so as to contact with the latter to close the valve. The faces of said ring portions are preferably formed by continuous elements which are parallel to the elements of the seat member so that said ring portions will contact the seat simultaneously. The portion of said valve between the said ring portions is recessed within the elements aforesaid to provide a space 21ª between the valve and the seat for the trapping of such solids as might otherwise injure or impair the contact at the rings. Thus the operation of the valve is rendered reliable and certain. Since the faces of the ring portions are flat and tapered as the seat, the contact is at all times an even, sliding contact, and since, moreover, the taper is small, all possibility of injuring the valve seat is eliminated.

The valve is mounted rotatably upon a valve stem 25 so as to secure a renewed or fresh seating of the valve thus enhancing the fluid tightness of the valve. For this purpose suitable anchor means such as a screw 26 is provided which passes through the central bore 27 in the valve and is threaded into the stem 25, the thread being sufficiently tight to prevent the screw from loosening. To prevent the passage of fluid through said central bore or bearing, a seat 28 is provided between the valve and the stem, said seat being made operative through abutment of the valve against the stem when the valve is forced into the seat 22 for closing the valve. The seat 28 is of a beveled or tapered character and consists preferably of a circumferential lip portion 29 on the stem and a beveled portion 30 upon the valve seating within said lip portion. The valve thus comprises in general a plurality of co-axial seats acting in co-operation with each other when the valve is to be closed for effecting a fluid-tight joint. The co-operation aforesaid is the result of a direct abutment relation due to the particular arrangement of the valve in connection with the valve seat and the stem.

As a valuable auxiliary feature to provide an independent valve and seat to become operative when the valve aforesaid for any reason refuses to function and must be removed, I show a disk valve 31 suitably mounted upon the stem 25 as in abutment relation with a shoulder 32 formed thereon to which said disk may be soldered or otherwise secured. Said disk valve comprises a face member made of rubber or other suitable composition material 33 which is retained as within the channel portion of the disk member formed by the circumferential flange 34. The valve so formed is adapted to seat upon the seat 35 formed coaxially with the seat 22. Preferably said valve is arranged to be operative only when the valve 21 has worn down or has been removed because defective or for a like reason. Thus the valve 31 provides an emergency device which the operator can use to control the flow of the fluid. More specifically, the valve 31 is spaced from the seat thereof so as not to contact the valve seat 35 when the valve 21 is closed. When, however, the last mentioned valve is removed, a slight additional turn of the stem and consequent lowering thereof brings the valve 31 into play to control the flow of fluid.

I claim:

1. In a valve mechanism, the combination with a valve body and a stem rotatably mounted therein, of a valve of frusto-conical form rotatably mounted upon said stem, and a seat of similar formation to receive said valve when the same is projected thereinto and to control the passage of fluid between the tapered sides of the valve and the tapered sides of the seat, said valve having a central bore co-axial with said seat and extending through the valve to permit the same to be rotatably mounted upon said stem, a frusto-conical seat being provided between said valve and said stem and surrounding the axis of said bore to prevent the passage of fluid therethrough, said seat being made effective by the abutment between the valve and the first mentioned seat to stop the flow of a fluid, said valve being provided with a pair of ring portions of frusto-conical form, the elements of the different ring portions being substantially parallel to the elements of said seat, said ring portions having co-operation with said seat to control the flow of fluid, said ring portions being located wholly at the ends of said valve to secure a proper balance and ease of alinement of said valve.

2. In a valve mechanism, the combination with a valve body and a stem rotatably mounted therein, of a valve of frusto-conical form mounted upon said stem, and a hollow frusto-conical seat to receive said valve, said valve having a plurality of ring portions for contacting said seat simultaneously, said ring portions having elements parallel to the elements of said seat and being located wholly at the ends of said valve, the portion between said rings being spaced from said seat when the valve is closed to contain such solids as would otherwise injure said seat and ring portions.

In testimony whereof I affix my signature.

JACOB S. KATZIN.